(12) United States Patent
Chamarthi et al.

(10) Patent No.: US 11,996,991 B2
(45) Date of Patent: May 28, 2024

(54) METHOD AND SYSTEM FOR EFFECTIVE SERVICE FULFILLMENT IN COMMUNICATION NETWORKS

(71) Applicant: Wipro Limited, Bangalore (IN)

(72) Inventors: Reshmasree Chamarthi, Puttur (IN); Swaminathan Seetharaman, Chennai (IN); Priyadharshini B, Aruppukottai (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/658,084

(22) Filed: Apr. 5, 2022

(65) Prior Publication Data

US 2023/0261952 A1 Aug. 17, 2023

(30) Foreign Application Priority Data

Feb. 15, 2022 (IN) .............................. 202241007831

(51) Int. Cl.
*H04L 41/5009* (2022.01)
*H04L 41/0816* (2022.01)
*H04L 41/5022* (2022.01)

(52) U.S. Cl.
CPC ...... *H04L 41/5009* (2013.01); *H04L 41/0816* (2013.01); *H04L 41/5022* (2013.01)

(58) Field of Classification Search
None
See application file for complete search history.

(56) References Cited

U.S. PATENT DOCUMENTS

| | | | | |
|---|---|---|---|---|
| 2018/0317134 A1* | 11/2018 | Leroux | ................ | H04L 61/5038 |
| 2018/0359337 A1* | 12/2018 | Kodaypak | ............... | H04L 67/52 |
| 2020/0053834 A1* | 2/2020 | Dahan | ................ | H04L 41/0816 |
| 2020/0344679 A1* | 10/2020 | Jin | ........................ | H04W 76/12 |
| 2021/0185695 A1* | 6/2021 | Gupta | ................... | H04W 28/16 |

(Continued)

OTHER PUBLICATIONS

"3rd Generation Partnership Project; Technical Specification Group Services and System Aspects; Telecommunication management; Study on the Self-Organizing Networks (SON) for 5G networks (Release 16)", 3GPP TR 28.861 V16.0.0 (Dec. 2019).

(Continued)

*Primary Examiner* — Kevin T Bates
*Assistant Examiner* — Dae Kim
(74) *Attorney, Agent, or Firm* — Finnegan, Henderson, Farabow, Garrett & Dunner, LLP

(57) ABSTRACT

A method and system for effective service fulfillment in a communication network is disclosed. The method includes determining utilization of each of a plurality of resources for each of a plurality of network slice instances. The method further includes determining a service allocation schedule and a service resource utilization across one or more service classes and one or more resource classes for each of the plurality of resources; determining at least one of a set of possible actions required to be performed in at least one of the plurality of resources, a plurality of services, and the plurality of network slice instances based on a consolidation plan; assessing an impact of each of the set of possible actions based on a plurality of factors; and triggering a relevant network function(s) to perform at least one of the set of determined possible actions based on the assessed impact.

20 Claims, 8 Drawing Sheets

(56) References Cited

U.S. PATENT DOCUMENTS

2022/0124560 A1* 4/2022 Yeh ................. H04W 28/26
2022/0210669 A1* 6/2022 Yu .................... H04W 4/50
2022/0217059 A1* 7/2022 Vidal ............... H04L 41/5025
2022/0294709 A1* 9/2022 Mannweiler ...... H04L 41/5051
2024/0015599 A1* 1/2024 Godin .............. H04W 36/0005

OTHER PUBLICATIONS

Leconte, M., et al., "A Resource Allocation Framework for Network Slicing", IEEE 2018, 9 pages.

* cited by examiner

| N-S instance 502A | Resource Type 504A | Resource Category 506A | Resource Occupancy level 508A | | |
|---|---|---|---|---|---|
| | | | Area 1 | Area 2 | Area 3 |
| 1 | Spectrum | Normal | 40% | 70% | 50% |
| | | Premium 1 | ..... | ..... | ..... |
| ..... | | | | | |
| M | Optical Transport | | X% | Y% | Z% |

FIG. 5A

METHOD AND SYSTEM FOR EFFECTIVE SERVICE FULFILLMENT IN COMMUNICATION NETWORKS

TECHNICAL FIELD

This disclosure relates generally to network services, and more particularly to method and system for effective service fulfillment in a communication network.

BACKGROUND

Network slicing refers to a process of creating network slices by partitioning of a network into several virtual networks as per need of end users, wherein each such virtual network is configured and optimized for particular application(s)/service(s). Moreover, network slicing may be employed to efficiently cater to different kinds of services with varying performance requirements. In a network employing network slicing, service fulfillment may have following challenges including insufficient availability of resources or network slice instances that leads to service refusal, insufficient availability of suitable types of resources or network slices that may lead to service refusal, and static or inappropriate allocation of resources and/or network slices leading to service SLA non-compliance and/or inappropriate fulfillment.

In order to provide effective service fulfillment, it becomes essential for a service provider to take into account incoming service requests and perform demand-based network slicing and dynamic allocation of resources, taking into consideration present and future needs, based on pattern and nature of service requests over a period of time. Currently, existing mechanisms focus on appropriate resource allocation taking into consideration service performance requirements (SLAs) and service characteristics, determining of service profile and slice profiles based on user entitlement and service class in addition to performance requirements (SLAs) and service characteristics, network slice instance resource allocation optimization, and optimal resource allocation.

However, none of the existing mechanisms provide effective service fulfillment as the existing mechanisms only keeps track of resource usage per slice and per service which may lead to service denial under conditions of insufficient resources of appropriate type relevant for the service class and user category. Further, the existing mechanisms do not efficiently cater to new service requests, as under conditions of insufficient resources of the appropriate type, service denial or inappropriate resource allocation may happen for new service requests. Moreover, existing mechanisms provides optimization of resources for each active slice instance, this may result in limited optimization only (due to local optimization at each slice instance level) without considering the services running on different slices, service classes of the active services, and the type of resources allocated to those services. This limitation could result in service denial or service fulfillment issues due to insufficient resources of the appropriate type.

Therefore, there is a need of a mechanism for proving efficient and effective service fulfillment in a communication network.

SUMMARY

In an embodiment, a method for effective service fulfillment in a communication network is disclosed. In one embodiment, the method may include determining utilization of each of a plurality of resources for each of a plurality of network slice instances. It should be noted that, each of the plurality of network slice instances includes a set of network slice subnet instances. The method may further include determining a service allocation schedule and a service resource utilization across one or more service classes and one or more resource classes for each of the plurality of resources. The method may further include determining at least one of a set of possible actions required to be performed in at least one of the plurality of resources, a plurality of services, and the plurality of network slice instances based on a consolidation plan. It should be noted that, the consolidation plan is created based on the service allocation schedule and the service resource utilization. The method may further include assessing an impact of each of the set of possible actions based on a plurality of factors. It should be noted that, the plurality of factors comprises at least one of dynamic network conditions, active network slice instances, and service instances. The method may further include triggering a relevant network function(s) to perform at least one of the set of determined possible actions based on the assessed impact.

In another embodiment, a system effective service fulfillment in a communication network is disclosed. The system includes a processor and a memory communicatively coupled to the processor, wherein the memory stores processor executable instructions, which, on execution, causes the processor to determine utilization of each of a plurality of resources for each of a plurality of network slice instances. It should be noted that, each of the plurality of network slice instances includes a set of network slice subnet instances. The processor executable instructions further cause the processor to determine a service allocation schedule and a service resource utilization across one or more service classes and one or more resource classes for each of the plurality of resources. The processor executable instructions further cause the processor to determine at least one of a set of possible actions required to be performed in at least one of the plurality of resources, a plurality of services, and the plurality of network slice instances based on a consolidation plan. It should be noted that, the consolidation plan is created based on the service allocation schedule and the service resource utilization. The processor executable instructions further cause the processor to assess an impact of each of the set of possible actions based on a plurality of factors, wherein the plurality of factors comprises at least one of dynamic network conditions, active network slice instances, and service instances. The processor executable instructions further cause the processor to trigger a relevant network function(s) to perform at least one of the set of determined possible actions based on the assessed impact.

In yet another embodiment, a non-transitory computer-readable storage medium for effective service fulfillment in a communication network is disclosed. The non-transitory computer-readable storage medium has instructions stored thereon, a set of computer-executable instructions causing a computer comprising one or more processors to perform steps comprising determining utilization of each of a plurality of resources for each of a plurality of network slice instances, wherein each of the plurality of network slice instances includes a set of network slice subnet instances; determining a service allocation schedule and a service resource utilization across one or more service classes and one or more resource classes for each of the plurality of resources; determining at least one of a set of possible actions required to be performed in at least one of the plurality of resources, a plurality of services, and the plurality of network slice instances based on a consolidation plan, wherein the consolidation plan is created based on the service allocation schedule and the service resource utilization; assessing an impact of each of the set of possible actions based on a plurality of factors, wherein the plurality of factors comprises at least one of dynamic network conditions, active network slice instances, and service instances; and triggering a relevant network function(s) to perform at least one of the set of determined possible actions based on the assessed impact.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5A-5B is a table depicting resource utilization across different geographical area by a plurality of network slice instance and a plurality of slice subnet instance, in accordance with some exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
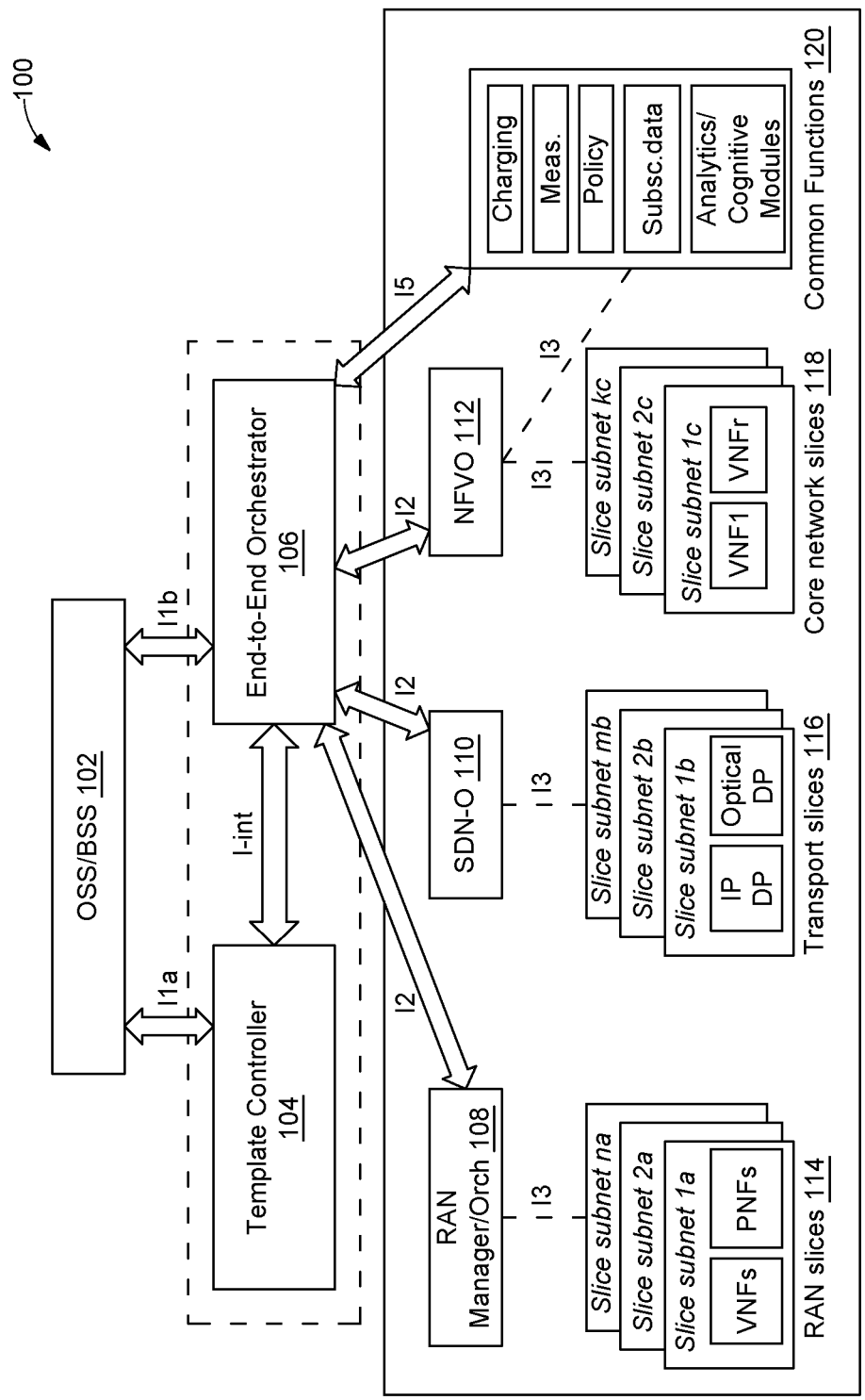
FIG. 1 represents a block diagram of a system for effective service fulfillment in a communication network, in accordance with some embodiment.

Referring now to FIG. 1, a block diagram of a system 100 for effective service fulfillment in a communication network is illustrated, in accordance with an embodiment. The system 100 displays an end-to-end network view of various components in a network that is configured for service fulfillment. The system 100 may include an Operations Support System and Business Support System (OSS/BSS) 102. The OSS/BSS 102 may be connected to a template controller 104, and an end-to-end orchestrator 106 via an interface 'I1a' and 'I1b' respectively. In an embodiment, the template controller 104 may interact and exchange information with the end-to-end orchestrator 106 via an interface 'I-int'. Further, the end-to-end orchestrator 106 of the system 100 may interact with each of a Radio Access Network (RAN) manager (also referred as RAN orchestrator) 108, a Software Defined Network Orchestrator (SDN-O) 110, and a Network Functions Virtualization Orchestrator (NFV-O) 112, via an interface 'I2'.

Further, the RAN manager 108 may interact with a plurality RAN network slices 114 via an interface 'I3'. In an embodiment, each of the plurality of RAN network slices 114 may include a plurality of slice subnet instances (also referred as slice subnets). By way of an example, each of the plurality of RAN network slices 114 may include slice subnets '1a' to 'na'. Moreover, each of the plurality of slice subnets, i.e., '1a' to 'na' may include a plurality of Virtual Network Functions (VNFs) and a plurality of Physical Network Functions (PNFs).

Further, the SDN-O 110 may interact with a plurality transport network slices 116 via an interface 'I3'. In an embodiment, each of the plurality of transport network slices 116 may include a plurality of slice subnet instances (also referred as slice subnets). By way of an example, the plurality of transport network slices 116 may include slice subnets '1b' to 'mb'. Moreover, each of the plurality of slice subnets, i.e., '1b' to 'mb' may include Internet Protocol Data Plane (IP DP) and Optical DP. Further, the NFV-O 112 may interact with a plurality of core network slices 118 via an interface 'I3'. In an embodiment, each of the plurality of core network slices 118 may include a plurality of slice subnet instances (also referred as slice subnets). By way of an example, each of the plurality of core network slices 118 may include slice subnets '1c' to 'kc'. Moreover, each of the plurality of slice subnets, i.e., '1c' to 'kc' may include, VNFs, for example, VNF1 and VNFr. Further, the end-to-end orchestrator 106 and the NFV-O 112 may interact with common functions 120 via an interface 'I5' and the interface 'I3' respectively. The common functions 120 may include charging, measurement, policy, subscriber data (and its management), and an analytics module (also referred as cognitive module).

Figure 2:
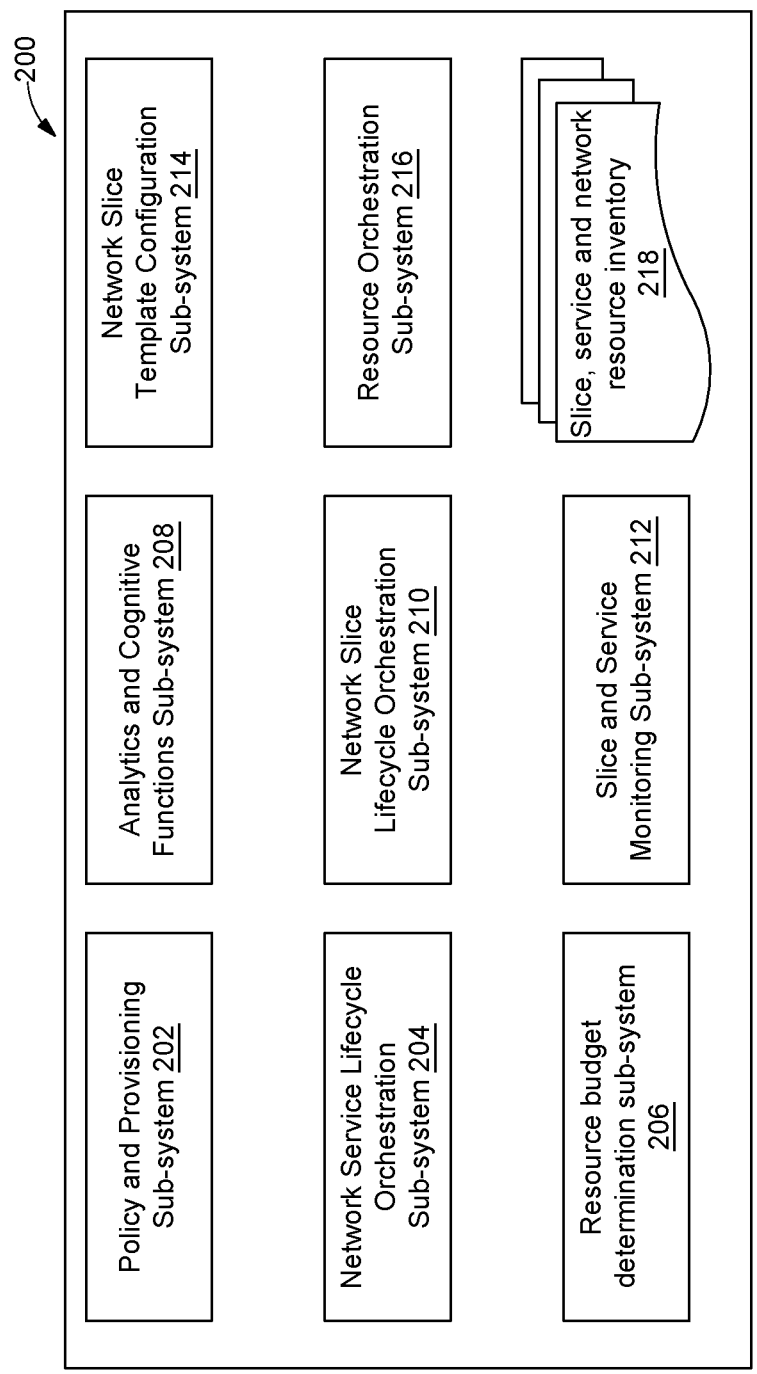
FIG. 2 illustrates a functional block diagram of various modules within an end-to-end orchestrator for effective service fulfillment in a communication network, in accordance with some embodiment.

Referring now to FIG. 2, a block diagram of various modules within the end-to-end orchestrator 106 configured for effective service fulfillment in a communication network is illustrated, in accordance with an embodiment. The end-to-end orchestrator 106 includes a policy and provisioning sub-system (POL-PROV-SS) 202, a network service lifecycle orchestration sub-system (NTW-SERV-ORCH-SS) 204, a resource budget determination sub-system (RES-BUD-SS) 206, an analytics and cognitive functions sub-system (AN-COF-SS) 208, a network slice lifecycle orchestration sub-system (NTW-SL-ORCH-SS) 210, a slice and service monitoring sub-system (SL-SRV-MON-SS) 212, a network slice template configuration sub-system (NTW-ST-CONF-SS) 214, a resource orchestration sub-system (RES-ORCH-SS) 216, and slice, service, and network resource inventory (SL-SRV-RES-INV) 218.

The POL-PROV-SS 202 may be configured to receive information including all policy and provisioned inputs. The POL-PROV-SS 202 may then send relevant aspects of the received information to relevant sub-systems in the end-to-end orchestrator 106. The POL-PROV-SS 202 may also receive request for service creation, modification, deletion, activation, and deactivation from the OSS 102. In addition to existing functionalities, the POL-PROV-SS 202 may obtain inputs abouts all the policies and rules associated with service classes and resource classes, allocation of a plurality of network slices to specific service classes, etc. In an embodiment, these inputs may be captured through regulatory or network policy provisioning, or it may be queried by the POL-PROV-SS 202 to the OSS 102.

The NTW-SERV-ORCH-SS 204 may be responsible for orchestration of a network service including service instantiation (on the network slice provided by the NTW-SL-ORCH-SS 210 in the presence of network slicing). Further, the NTW-SERV-ORCH-SS 204 may be responsible for scaling up/down resources and limits for access, healing, modification, and termination of the service. In addition to its existing functions, the NTW-SERV-ORCH-SS 204 may provide updates to the NTW-SL-ORCH-SS 210 on service class and priority treatment, upgrade of priority or service class, etc. Moreover, the NTW-SERV-ORCH-SS 204 may re-instantiate the service on a new network slice due to consolidation or other changes triggered by the NTW-SL-ORCH-SS 210, based on the inputs captured by NTW-SERV-ORCH-SS 204. In addition, the NTW-SERV-ORCH-SS 204 may determine requirement for change in resource category allocated to the service. In reference to FIG. 1, based on the determined requirement, the NTW-SERV-ORCH-SS 204 may update the OSS 102 accordingly (e.g., for appropriate charging for the service).

The RES-BUD-SS 206 may be configured to determine appropriate resource budgets for every network segment/sub-net in the network slice based on a Software Requirement Specification (SRS) and dynamic network conditions. Examples of the resource budgets may include, but is not limited to, a latency and a throughput budget for each network segment/sub-net, access type, etc. The RES-BUD-SS 206 may adapt the resource budgets based on trigger received from the NTW-ST-CONF-SS 214. The trigger received from the NTW-ST-CONF-SS 214 may include an adapted SRS. Moreover, the RES-BUD-SS 206 may adapt thresholds and parameter weights, etc. used in determination of the resource budgets with relevant inputs from the SL-SRV-MON-SS 212 and the AN-COF-SS 208. In addition to its existing functionalities, the RED-BUD-SS 206 may adapt rankings of solutions to be aligned with the service class to which the service request belongs.

The AN-COF-SS 208 may be responsible for performing all analytics and cognitive functions related to service and slice orchestration. Moreover, the AN-COF-SS 208 may be invoked by the relevant sub-system for performing necessary prediction/detection. In an embodiment, the AN-COF-SS 208 may be invoked by the NTW-SL-ORCH-SS 210, the NTW-ST-CONF-SS 214, the SL-SRV-MON-SS 212, or the NTW-SERV-ORCH-SS 204. Examples of prediction/detection performed by the AN-COF-SS 208 may include, but is not limited to, resource occupancy trend in a network slice, and a root cause analysis for a network segment failure. Further, the AN-COF-SS 208 may provide relevant inputs on capability of each of the plurality of network segments to the RES-BUD-SS 206 during determination of resource budgets for the each of the plurality of network segments. Moreover, the AN-COF-SS 208 may also provide relevant inputs for adjustments to the rules and thresholds for determining updates to the SRS based on USER-ENTLMENT. In addition to its existing functions, the AN-COF-SS 208 may provide traffic patterns per service, per service class, per geographic area, per network slice instance, per network slice sub-net instance, per time interval, etc. that are predicted at a granular as well as aggregated level. The AN-COF-SS 208 may also provide resource occupancy levels per service, per service class, per slice instance, per resource category, per geographic area, per time interval, etc. that are predicted at a granular as well as aggregated level. Additionally, the AN-COF-SS 208 may predict fault/performance issues per resource type and category, per service class, per slice instance, etc. Further, the AN-COF-SS 208 may provide the predicted traffic patterns, the predicted resource occupancy levels, and the predicted fault/performance issue to the relevant sub-systems, such as, the NTW-SERV-ORCH-SS 204, the NTW-SL-ORCH-SS 210, etc.

The NTW-SL-ORCH-SS 210 may be responsible for all orchestration functions associated with each of the plurality of network slices. The orchestration functions may include, but is not limited to, instantiation of a new network slice, scaling up/down, healing and making modifications, and terminating/decommissioning the network slice. As will be appreciated, the NTW-SL-ORCH-SS 210 may work close with the NEW-ST-CONF-SS 214 in order to instantiate or reuse an appropriate network slice instance. In addition to its existing functions, the NTW-SL-ORCH-SS 210 may determine need for reallocation of resources to existing network slices and services in order to enable service fulfillment under resource-constrained situations. Moreover, the NTW-SL-ORCH-SS 210 may determine need for consolidation of services and network slices, and the resources allocated to the network slices. The NTW-SL-ORCH-SS 210 may also determine consolidation to be done to the network slices. The NTW-SL-ORCH-SS 210 may determine need for re-mapping one or more services to different network slices. Additionally, the NTW-SL-ORCH-SS 210 may determine ways to fulfill the service request under resource-constrained conditions based on policy, dynamic network conditions, other services and slices that are active, etc. and triggers the NTW-ST-CONF-SS 214 accordingly for providing a suitable network slice instance. The NTW-SL-ORCH-SS 210 may trigger the RES-ORCH-SS 216 for appropriate allocation/reallocation/optimization of resources when the service request is received, and appropriate reallocation/optimization of resources based on analysis of Fault Management (FM) and Performance Management (PM) data. Examples of FM data include, but is not limited to, alarms and threshold crossing alerts. Examples of PM data include, but is not limited to, traffic counters, resource occupancy trends, and Key Performance Indicator values.

The SL-SRV-MON-SS 212 may be responsible for monitoring adherence levels of the network slice (end-to-end as well as network segment/sub-net level), service target KPIs, and requirements. The SL-SRV-MON-SS 212 may report any fault/performance issues in the network slice or the services to the NTW-SL-ORCH-SS 210 or the NTW-SERV-ORCH-SS 204 respectively. The SL-SRV-MON-SS 212 may monitor adherence levels of the resource budgets allocated to various network subnets. In addition to its existing functions, the SL-SRV-MON-SS 212 may also provide a granular as well as aggregated view of various fault and performance events in the network slices and services, including service-class level resource occupancy, service-level resource occupancy in a shared network slice instance or a slice sub-net instance, occupancy levels of each resource category per geographic area, and resource occupancy levels per geographical area (could be region, cell-level, tracking area level, registration area level, data-center level, etc.), etc.

The NTW-ST-CONF-SS 214 may be responsible for determining a suitable network slice instance for fulfilling the service request upon receiving a trigger from the NTW-SL-ORCH-SS 210. The determination of the suitable network slice instance by the NTW-ST-CONF-SS 214 may include providing details of an existing network slice instance that may be reused, and/or creation of a new network slice instance that includes details of the existing network slice subnet instances that can be reused (as-is or with minor modifications), and/or details of new network slice subnet instance(s) that needs to be created. In addition, the NTW-ST-CONF-SS 214 may trigger the RES-BUD-SS 206 for determining resource budgets for various network segments/sub-nets when the new network slice instance needs to be created. Further, the NTW-ST-CONF-SS 214 may provide updated network slice instance allocation information when triggered by the NTW-SL-ORCH-SS 210 with an adapted SRS (i.e., the updated SRS). In addition to its existing functions, the NTW-ST-CONF-SS 214 may consider additional inputs received from the NTW-SL-ORCH-SS 210 when determining a N-S shell hierarchy (for e.g., consider resources of higher category that may be normally allocated for a specific type of network slice instance or service).

The RES-ORCH-SS 216 may be responsible for performing resource orchestration for the service or the network slice. In addition to its existing functions, the RES-ORCH-SS 216, under direction of the NTW-SL-ORCH-SS 210, may determine appropriate resources to be allocated for the received slice request during scarcity/unavailability of resources of the required resource category. Further, the RES-ORCH-SS 216 may determine resources to be reallocated to the existing network slices and services running on those network slices. In addition, the RES-ORCH-SS 216 may determine resources to be optimized in the existing network slices and services running on those network slices.

The SL-SRV-RES-INV 218 may correspond to a component that contains details of network slice templates and active network slice instances, slice subnet templates and active network slice sub-net instances, the SRS, resources allocated to each slice and slice subnet, active services, and details of network slice to which those services are mapped to. In addition to existing information, the SL-SRV-RES-INV 218 component may store information about resource allocation per resource type and category (including historical details of allocation/reallocation), network slice to service mapping (current as well as historical), network slice subnet to network slice mapping (current as well as historical), history of scaling, etc.

Figure 3:
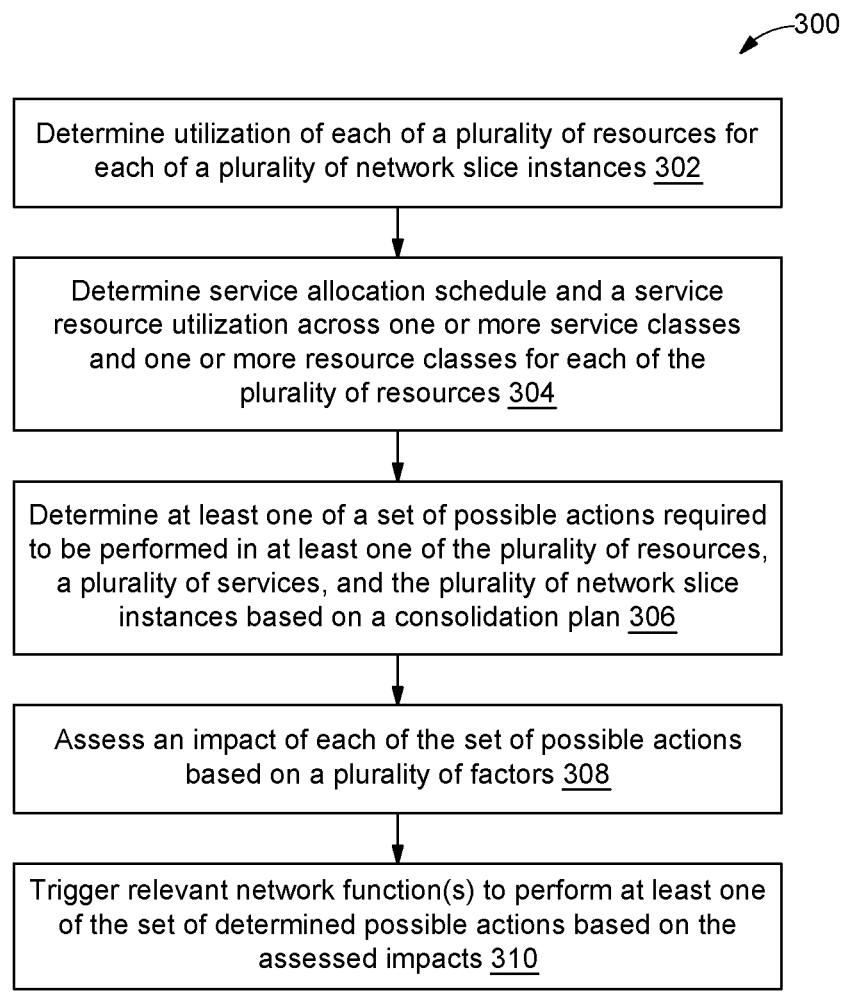
FIG. 3 illustrates a flowchart of a method for effective service fulfillment in a communication network, in accordance with some embodiment.

Referring now to FIG. 3, a flowchart of a method 300 for effective service fulfillment in a communication network is illustrated, in accordance with some embodiment. At step 302, utilization of each of a plurality of resources may be determined for each of a plurality of network slice instances. In an embodiment, each of the plurality of network slice instances may include a set of network slice subnet instances. In order to determine utilization of each of the plurality of resources, initially, in one embodiment, an availability of an appropriate resource from the plurality of resources may be determined upon receiving a new service request. The new service request may include performance requirements, a priority, a class associated with users, a geographical area of a service, a service class, and a duration of the service. In order to determine availability, a requirement of the appropriate resource(s) may be determined for the new service request. The requirement of the appropriate resource may be determined based on a set of service factors. The set of service factors may include service characteristics, service performance requirements, and service dimensions.

Moreover, in order to determine availability, initially, a first set of resource budgets and service performance requirements may be determined for each of the set of network slice subnet instances that shall form part of the network slice instance on which the new service shall run. In addition, a network shell hierarchy may be determined using a template hierarchy. The network shell hierarchy may include a slice subnet hierarchy. Further, based on the determined availability, a requirement for a change in one or more of the plurality of network slice instances may be identified in order to fulfil the new service request. In the present embodiment, the determination of the network shell hierarchy may correspond to identification of one of a reuse of an existing network slice instance or creation of a new network slice instance. Moreover, in order to create the new network slice instance, one of a reuse of an existing network slice subnet instance or creation of a new network slice subnet instance may be determined based on the slice subnet hierarchy.

In another embodiment, initially, at least one of a fault management data or a performance management data may be received from the communication network. Further, the at least one of the fault management data or the performance management data may be analyzed to identify one or more faults or one or more performance issues in the communication network. In present embodiment, the plurality of faults or the plurality of performance issues may be identified based on a pre-defined threshold, a pre-defined performance criteria, or a service level criteria. Once the plurality of faults or the plurality of performance issues are identified, then an impact of the plurality of faults or the plurality of performance issues on at least one of the plurality of network slice instances, the set of network slice subnet instances, services and service classes, and impacted geographical areas may be analyzed. Upon determining the impact, a requirement for a change in one or more of the plurality of network slice instances and/or one or more services may be identified. The requirement for the change may be identified based on an analysis of at least one of the fault management data or the performance management data.

Further, at step 304, a service allocation schedule and a service resource utilization may be determined across one or more service classes and one or more resource classes for each of the plurality of resources. In an embodiment, determination of the service allocation schedule and the service resource utilization includes determination of service level resource utilization and service class level resource utilization. The service level resource utilization and the service class level resource utilization may be determined based on the plurality of resources allocated to one or more services belonging to one or more service classes in various geographical areas associated with the service.

Upon determining the service allocation schedule and the service resource utilization, at step 306, at least one of a set of possible actions required to be performed in at least one of the plurality of resources, a plurality of services, and the plurality of network slice instances may be determined based on a consolidation plan. In an embodiment, the consolidation plan may be created based on the service allocation schedule and the service resource utilization. Moreover, the set of possible actions may include, but is not limited to, modification of resource allocation, merging of network slices, splitting of network slices, modification of network slices, and re-mapping one or more services to at least one of the network slice instances.

Further, at step 308, an impact of each of the set of possible actions may be assessed based on a plurality of factors. The plurality of factors may include at least one of dynamic network conditions, active network slice instances, and service instances. Moreover, the impact assessment of each of the set of possible actions may include at least one of an impact on service level criteria or key performance indicators of currently active services, an impact on service continuity of currently active services, an impact on performance of a network slice instance(s) or a network slice subnet instance upon mapping the new service or during at least one of the set of possible actions, an impact of minimum resource availability, and an impact on billing.

Based on the assessed impact, at step 310, relevant network function(s) may be triggered to perform at least one of the set of determined possible actions. Once the at least one of the set of determined possible action is performed, then, an effectiveness of performing the at least one of the set of modifications may be verified based on a new network slice shell hierarchy provided for the new service request. Further, a corrective action may be performed based on the effectiveness of the at least one of the set of possible actions.

Figure 4:
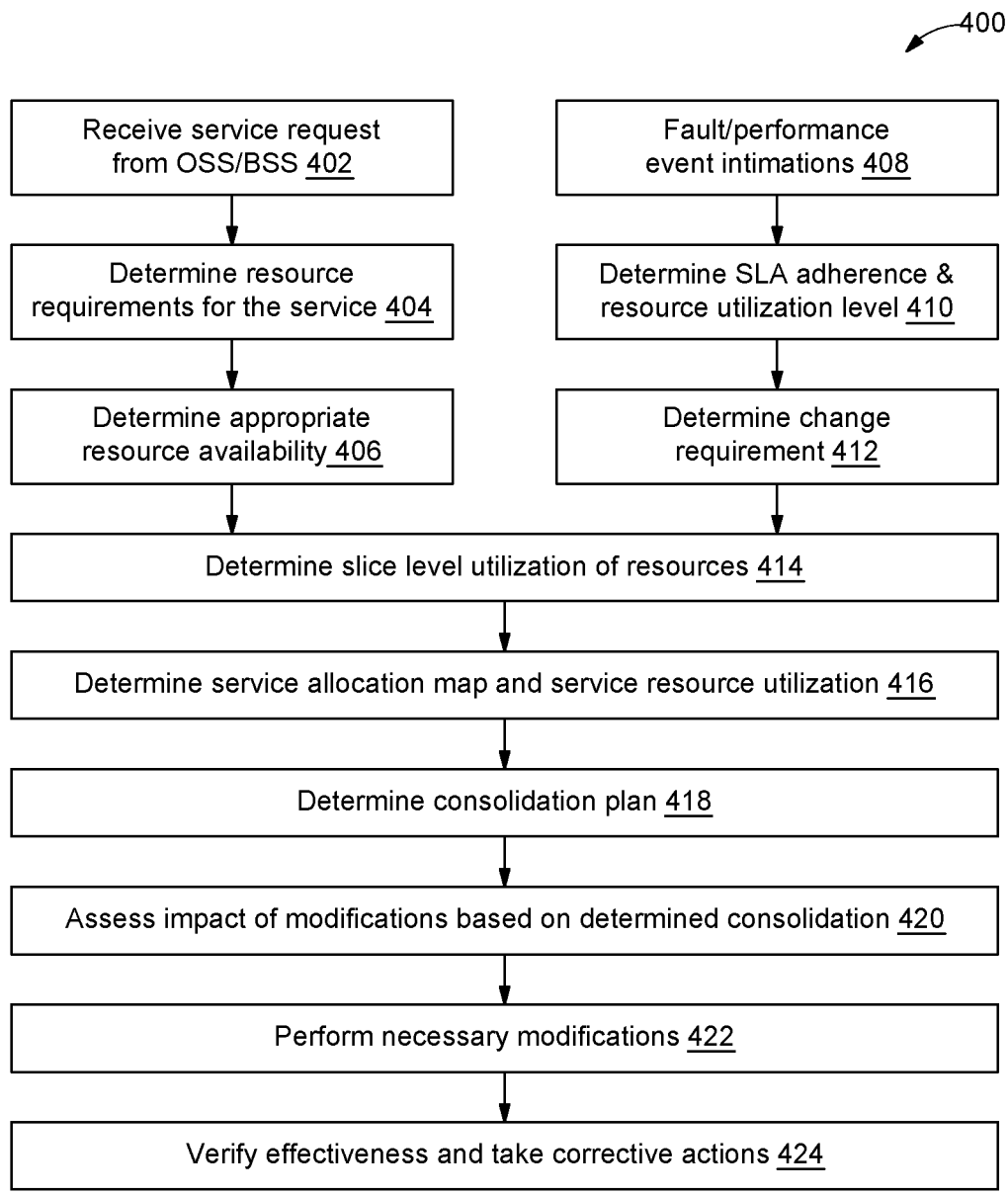
FIG. 4 illustrates a detailed flowchart of a method for effective service fulfillment in a communication network, in accordance with some embodiment.

Referring now to FIG. 4, a detailed flowchart of a method 400 for effective service fulfillment in a communication network is illustrated, in accordance with some embodiments. As will be appreciated, the detailed flowchart described in present FIG. 4 has been explained in reference to the FIG. 2. In one embodiment, in order to perform effective service fulfillment, initially, at step 402, the POL-PROV-SS 202 in an end-to end orchestrator may receive a new service request (also referred as a service creation request) from an OSS/BSS over an interface 'I1b'. In reference to FIG. 1, the end-t-end orchestrator may correspond to the end-to-end orchestrator 106. In addition, the OSS/BSS may correspond to the OSS/BSS 102. In an embodiment, the new service request may include performance requirements, a priority, a class associated with users, a geographical area of the service (i.e., coverage area of the service), a service class associated with the service, and a duration of the service. The POL-PROV-SS 202 may then pass the new service request to the NTW-SERV-ORCH-SS 204.

Upon receiving the new service request, at step 404, resource requirements for the new service request may be determined to fulfil the new service request. Moreover, the requirement of the appropriate resources may be determined based on the set of service factors. The set of service factors may include service characteristics, service performance requirement, and service dimensions. In an embodiment, the NTW-SL-ORCH-SS 210 may determine service characteristics (SRV-CHAR), service performance requirements (SRV-PERF-REQ), and service dimensions (SRV-DIM). Once the set of service factors are determined, then the NTW-SL-ORCH-SS 210 may form the SRS as described in prior art (dynamic slicing).

The NTW-SL-ORCH-SS 210 may then determine enhancements and adjustments to be done to the requirements of the new service request in the SRS based on user entitlement as described in prior art (resource budget). Further, the NTW-SL-ORCH-SS 210 may then form an updated SRS. The updated SRS may include updated service characteristics (UPD-SRV-CHAR), updated service performance requirements (UPD-SRV-PERF-REQ), and updated service dimensions (UPD-SRV-DIM). The NTW-SL-ORCH-SS 210 may then trigger the NTW-ST-CONF-SS 214 with the updated SRS for allocation of a suitable network slice instance on which the new service can be instantiated.

The NTW-ST-CONF-SS 214 may then request for a suitable template hierarchy to a template controller using relevant information present in the UPD-SRS (e.g., the UPD-PERF-REQ, and the UPD-SRV-CHAR). In reference to FIG. 1, the template controller may correspond to the template controller 104. Further, the template controller may provide the requested suitable template hierarchy using an existing mechanism. Upon reception of the suitable template hierarchy from the template controller, the NTW-ST-CONF-SS 214 may determine whether any existing network slice instance can be reused. After determining reuse of the existing network slice instance, the NTW-ST-CONF-SS 214 may trigger the RES-BUD-SS 206 to determine resource budgets for each of the plurality of network subnets instance present in the template hierarchy as provided by the template controller. In an embodiment, the RES-BUD-SS 206 may give a higher rank to a solution that is supporting same class of the new service request.

Further, at step 406, an availability of appropriate resources may be determined. In an embodiment, the NTW-ST-CONF-SS 214 may fetch the first set of resource budgets and service performance requirements (also referred as resource budget performance requirement, i.e., RES-BUD-PERF-RQMTS) provided by the RES-BUD-SS 206 for each of the plurality of subnets. Further, the NTW-ST-CONF-SS 214 may determine an appropriate network slice shell hierarchy, slice sub-net characteristics determined earlier, and RES-BUD-PERF-RQMTS as described in prior art. In an embodiment, the network slice hierarchy may include the slice subnet hierarchy and is determined using the template hierarchy determined by the template controller. This determination of the appropriate network slice shell hierarchy may also include determination of whether an existing network slice subnet instance can be reused, or a new network slice subnet instance needs to be created for each of the plurality of subnets. A process of determination of the appropriate network slice shell hierarchy may be repeated until a suitable network slice shell hierarchy is determined with feasibility to cater to the new service request (i.e., fulfill both performance requirements and resource requirements), or when all options are exhausted.

During determination of the appropriate network slice shell hierarchy three scenarios may be possible. By way of an example, in the first scenario, suppose sufficient resources may be available when deciding to reuse an existing slice instance or an existing slice subnet instance, even after catering to the new service request. In other words, the first scenario may include both situations, i.e., decision of reuse of the existing network slice instance or creation of the new network slice instance using the existing network slice subnet instances or new network slice subnet instances. In this scenario, sufficiency of requirements may be checked by the NTW-ST-CONF-SS 214 against a pre-defined threshold (also referred as resource availability thresholds, i.e., RES-AVAIL-THRESHOLD) for particular resource type and resource category, and for various service classes that are currently served by the communication network.

The check for the sufficiency of requirements may be done by the NTW-ST-CONF-SS 214 after determining need for scaling resources of the particular network slice instance or the network slice subnet instance when deciding to reuse an existing network slice instance or when creating a new network slice instance by reusing the existing network slice subnet instance(s) respectively. Moreover, in this scenario, remaining steps, i.e., step 414 to step 422 may be skipped, unless number of network slice instances or network slice subnet instances of the particular network slice instance exceed a pre-defined threshold, i.e., a network slice neighboring threshold (N-S-NBR-THRES).

By way of another example, consider a second scenario, where sufficient resources may be available for the new service request, however, remaining resource levels fall below the resource availability thresholds. In this scenario, the NTW-ST-CONF-SS 214 may provide relevant inputs to the NTW-SL-ORCH-SS 210 for determining the next step to be executed. Step 414 is then carried out next. By way of yet another example, consider a third scenario, where sufficient resources may not be available to fulfill the new service request. In this scenario, the NTW-ST-CONF-SS 214 may provide relevant inputs to the NTW-SL-ORCH-SS 210 for determining the next step for execution. Step 414 is then carried out next.

In another embodiment, in order to perform effective service fulfillment, initially at step 408, an intimation about one of a fault event or performance event may be received. Further, upon receiving the intimation, at least one of the fault management data or the performance management data may be fetched from the communication network. Upon reception of the at least one of fault management data or the performance management data from the communication network, the SL-SRV-MON-SS 212 stores may store the at least one of fault management data or the performance management data in a database (also referred as data lake). The SL-SRV-MON-SS 212 may then trigger the AN-COF-SS 208 to analyse the fault management data, or the performance management data reported from the communication network.

Once the at least one of the fault management data or the performance management data are fetched, at step 410, service level agreement (SLA) and resource utilization level may be determined. In order to determine the SLA and the resource utilization level, the AN-COF-SS 208 may perform the analysis as instructed by the SL-SRV-MON-SS 212. Based on the analysis of the fault management data, upon identifying one or more faults, the AN-COF-SS 208 may analyze an impact of the one or more faults on the plurality of network slice instances, the plurality of network slice subnet instances, services and service classes, geographical areas impacted, etc. Further, based on the analysis of the performance data, the AN-COF-SS 208 may predict traffic patterns and resource occupancy levels. In addition to the traffic patterns and the resource occupancy levels, the AN-COF-SS 208 may predict potential faults or SLA/KPI adherence issues associated with one or more of the plurality of network slice instances and/or service instances.

Based on the prediction, when any reporting condition is fulfilled (e.g., occurrence of a fault in a service) or any of the pre-defined thresholds are crossed (e.g., resource occupancy level threshold, SLA/KPI adherence level threshold, SLA/KPI violation probability threshold, etc.), the AN-COF-SS 208 may intimate the NTW-SL-ORCH-SS 210 and the NTW-SERV-ORCH-SS 204 for issues in one or more of the plurality of network slice instances, the plurality of network slice subnet instances, and services respectively. In an embodiment, the analysis and the prediction may be done by the AN-COF-SS 208 using well-known techniques such as linear regression, supervised learning, other machine learning or analytics techniques, or using proprietary mechanisms.

Further, at step 412, a requirement for a change in one or more of the plurality of network slice instances or one or more services may be determined based on the analysis. In an embodiment, based on inputs of the analysis that are provided by the AN-COF-SS 208, the NTW-SL-ORCH-SS 210 may determine whether any changes are required to the one or more of the plurality of network slice instances, the one or more services mapped to the one or more of the plurality of network slice instances, and the allocated resources. The determination of the change required may include determination of whether current and predicted resource occupancy levels of the one or more of the plurality of network slice instances or the plurality of network slice subnet instances are below a relevant network slice resource occupancy level threshold, i.e., N-S-RES-OCCUP-THRES. It should be noted that, the network slice resource occupancy level threshold may be specified based on a type of the network slice.

In addition, the determination for the requirement for the change may include determination of whether there is too much fragmentation of the plurality of network slice instances or the plurality of network slice subnet instances. For example, the one or more network slice instances of same type may be above than network slice instance threshold, i.e., N-S-INST-THRES in same (or overlapping) coverage area, and most of the one or more network slice instances are shareable (i.e., can cater to more than 1 service). Moreover, the determination for the requirement for the change may include determination of an issue in SLA/KPI adherence levels of the one or more of the plurality of network slice instances, or the plurality of network slice subnet instances. Based on above analysis, if the NTW-SL-ORCH-SS 210 may determine the requirement for the change, then the NTW-SL-ORCH-SS 210 may perform actions as illustrated by the step 414.

Further, based on inputs received on analysis of the one or more services by the AN-COF-SS 208, the NTW-SERV-ORCH-SS 204 may determine whether any changes are required to the one or more services, and the resources allocated to the one or more services. In order to determine the changes required, the NTW-SERV-ORCH-SS 204 may determine whether current and predicted resource occupancy levels of one or more active service instances are below a relevant service resource occupancy level threshold, i.e., SERV-RES-OCCUP-THRES. The service resource occupancy level threshold maybe specified based on the service class. In addition, the NTW-SERV-ORCH-SS 204 may determine if there is an issue in the SLA/KPI adherence levels of the one or more active service instances. Further, based on above determination, upon determining the requirement for the change in the one or more services, the NTW-SERV-ORCH-SS 204 may request the NTW-SL-ORCH-SS 210 to carry out the actions described in the step 414 by providing relevant inputs about the one or more active service instances and the associated resource occupancy levels, etc.

Once the availability of the appropriate resource and the requirement for the change is determined, at step 414, slice level utilization of resources may be determined. In other words, the NTW-SL-ORCH-SS 210 may determine resources of each type allocated to each of the plurality of network slice instances and the plurality of network slice subnet instances across the geographical areas (also referred as the coverage areas), and the level of occupancy (e.g., the level of occupancy may be determined in percentage). The NTW-SL-ORCH-SS 210 may then prepare a table 500A as depicted by a FIG. 5A. The table 500A may include resource utilization across different geographical areas by each of the plurality of network slice instances. In other words, the table 500A may represent the utilization of the plurality of resources across different geographical areas. In an embodiment, splitting of the different geographical area may be done based on tracking area, rectangular grids, or any other method.

In the table 500A, each row of a first column, i.e., network slice instance 502A may represent each of the plurality of network slice instances. Further, each row of a second column, i.e., resource type 504A may represent a type of resource allocated to each of the plurality of network slice instances. Each row of a third column, i.e., a resource category 506A represents the category of each of the plurality of resources allocated to each of the plurality of network slice instances. Further, last column, i.e., a resource occupancy level 508A may include sub-columns, i.e., an 'Area 1', an 'Area 2' and an 'Area 3'. In an embodiment, each sub-columns may correspond to the different geographical areas. Moreover, the last column, i.e., the resource occupancy level 508A may represent the level of occupancy of each of the plurality of resources in each of the different geographical areas depicted via the sub-columns. It should be noted that, the table 500A depicted in the FIG. 5 may be further extended by showing the resource occupancy levels predicted for the geographical area, for various time intervals.

Figure 5B:

Similar to the table 500A, the NTW-SL-ORCH-SS 210 may then prepare a table 500B as depicted by a FIG. 5B. The table 500B may include resource utilization across different geographical areas by each of the plurality of slice subnet instances. In an embodiment, splitting of the different geographical areas may be done based on tracking area, rectangular grids, or any other method. In the table 500B, each row of a first column, i.e., network slice subnet instance 502B may represent each of the plurality of network slice instances. Further, each row of a second column, i.e., network slice instance it belongs to 504B may represent at least one of the plurality of network slice instances to which one or more of the plurality of network slice subnet instances may belong to. Each row of a third column, i.e., a resource type 506B may represent a type of resource allocated to each of the plurality of network slice subnet instances. Each row of a fourth column, i.e., a resource category 508B may represents the category of the each of the plurality of resources allocated to each of the plurality of network slice subnet instances. Further, the last column, i.e., a resource occupancy level 510B may include sub-columns, i.e., an 'Area 1', an 'Area 2' and an 'Area 3'. In an embodiment, the sub-columns may correspond to the different geographical areas. Moreover, the last column, i.e., the resource occupancy level 510B may represent the level of occupancy of each of the plurality of resources in each of the different geographical areas as depicted via the sub-columns.

It should be noted that, the type of each of the plurality of resources and the category of each of the plurality of resources may vary depending on type of each of the plurality of subnet instances. For example, a type of resource in case of Radio Access Network (RAN) may be spectrum, compute, etc. Moreover, a category of resource in case of RAN subnet may be cellular-5 GHz band, cellular mmWaves, cellular-unlicensed, Wi-Fi, cellular-emergency use, cellular-premium spectrum, etc.

Once the utilization of each of the plurality of resources are determined, at step 416, a service allocation schedule and a service resource utilization may be determined across one or more service classes and one or more resource classes for each of the plurality of resources. In an embodiment, the NTW-SL-ORCH-SS 210 may determine service level and service class level resource utilization over time (including forecasted utilizations) based on one or more of the plurality of resources allocated to it (including potential scaling up/down as needed) across the different geographical areas, and contribution of the one or more of the plurality of resources in overall network slice instance resource occupancy and network slice subnet instance occupancy level for various types of the plurality of resources. In order to determine the service level and the service class level resource utilization along with the contribution of the one or more of the plurality of resources, the NTW-SL-ORCH-SS 210 may obtain relevant inputs from the AN-COF-SS 208.

Figure 6:
FIG. 6 is a table depicting level of occupancy of each of a plurality of resources across one or more services and service classes for different geographical areas, in accordance with some exemplary embodiment.

The NTW-SL-ORCH-SS 210 may then utilize the relevant inputs obtained from the AN-COF-SS 208 to prepare a table. In other words, the NTW-SL-ORCH-SS 210 may capture the level of occupancy of each of the plurality of resources across the one or more services and service classes for the different geographical areas over time. The captured information may be collected and stored in a form of the table as depicted via a table 600 of a FIG. 6. Further, the NTW-SL-ORCH-SS 210 may determine the service level and service class level resource utilization over time across the different geographical areas via the table 600. In the table 600, each row of a first column, i.e., service class 602 may depict a class associated with each of the plurality of services. Each row of a second column, i.e., service ID 604 may represent a unique identification (ID) provided to each of the plurality of services. Each row of a third column, i.e., network slice instance 606 may represent one of the plurality of network slice instances currently serving one of the plurality of services. Each row of a fourth column, i.e., 608 may represent one of the plurality of network slice subnet instance currently serving one of the plurality of services.

Further, each row of a fifth column, i.e., resource type 610 may represent a type of one of the plurality of resources being allocated to the one of the plurality of services. Each row of a sixth column, resource category 612 may represent a category of one of the plurality of resources currently allocated to the one of the plurality of services. Each row of a last column, i.e., resource occupancy level 614 may include sub-columns, i.e., an 'Area 1', an 'Area 2' and an 'Area 3'. In an embodiment, the sub-columns may correspond to the different geographical areas. Moreover, the last column, i.e., the resource occupancy level 614 may represent the level of occupancy of each of the plurality of resources in each of the different geographical areas as depicted via the sub-columns.

The overall resource occupancy level of a network slice instance by a service or service class may be determined as an average of consolidated resource occupancy levels of its constituent network slice subnet instances (i.e., the plurality of network slice subnet instances). The table 600 of the FIG. 6 may be used to determine the overall resource occupancy level, along with the contribution of each service and service class's contribution (in percentage) to the overall resource occupancy levels. In other words, the overall resource occupancy level may depict number of resources being used by the service and the service class that are being served by the network slice instance (and the constituent network slice subnet instances). It should be noted that, services belonging to same service class may be served by one or more of the plurality of network slice instances, which, in turn, shall be composed of one or more of the plurality of network slice subnet instances of same type. In an embodiment, a particular service may be served by resources spanning one or more categories for same resource type. This may be due to availability constraints, resource cost, requirements for the service (reliability, SLAs, etc.), resource optimization, etc.

Further, the NTW-SL-ORCH-SS 210 may prepare a detailed allocation map (taking potential scaling into consideration which will be done to accommodate the traffic, i.e., to be in line with the traffic pattern or to ensure that the resource occupancy levels don't cross thresholds which could impact SLAs/KPIs and/or cause service disruption) including the level of occupancy and utilization of each of the plurality of resource with the service class, the resource type, and the resource category. Moreover, with the relevant inputs obtained from the AN-COF-SS 208, the NTW-SL-ORCH-SS 210 may determine resource occupancy trends, any spikes (transient peaks or troughs in occupancy levels), etc. which shall be taken into account, when determining the consolidation plan.

The NTW-SL-ORCH-SS 210 may also determine if there are any improper distribution of one or more of the plurality of resources to each of the service classes (e.g., a lower priority resource or a lower reliability resource allocated to a higher service class, a higher priority resource allocated to a lower service class, etc.). The determined information may then be stored with an indication for one of the set of possible actions (also referred as possible corrective action or possible optimization). By way of an example, in case the lower priority resource or the lower reliability resource is allocated to the higher service class, then in such case at least one of the set of possible action may need to be performed. By way of another example, in case a higher priority resource is allocated to a lower service class, then in such case there may be requirement for optimization of the higher priority resources, so that the higher priority resources can be freed up to be able to accommodate another service associated to the higher service class and is more appropriate to use the higher priority resources.

Once the service allocation map and the service resource utilization are determined, at step, 418, a consolidation plan may be determined. In an embodiment, the NTW-SL-ORCH-SS 210 may determine the consolidation plan based on the service allocation map and the service resource utilization. Moreover, consolidation may include performing of one or more of the set of possible actions. The set of possible actions may include modification of resource allocation, merging of network slices, splitting of network slices, modification of network slices, and re-mapping one or more services to at least one of the network slice instances. It should be noted that, the set of possible actions may need not to be necessarily carried out in sequence. By way of an example, the NTW-SL-ORCH-SS 210 may start with the highest service class and carry out the actions relevant to it, and then continue in descending order of the service classes to perform the set of possible actions relevant to each of those service classes. Alternatively, NTW-SL-ORCH-SS 210 may start with a geographical area which has heavy resource constraint and carry out the actions relevant to it, and then continue the process in descending order of geographical areas with resource constraint level until the NTW-SL-ORCH-SS 210 finishes the actions for all the geographical areas. Moreover, when the consolidation plan needs to be determined because of the new service request, then the NTW-SL-ORCH-SS 210 may initially decide to determine the set of possible actions for the service class to which the new service request belongs to, before proceeding further with lower service classes, and then addressing higher service classes.

In an embodiment, a first possible action from the set of possible actions, i.e., modification of resource allocation may include two sub-actions, i.e., reallocation of resources to be in line with the service classes and scaling up/down of the plurality of resources (of one or more resource types and resource categories). By way of an example, in first sub-action, i.e., reallocation of resources to be in line with the service classes, the reallocation of resources may be performed by allocating the one or more of the plurality of resources of an appropriate category to the services of the same service class, hence to the network slice instance(s) and the network slice subnet instance(s) catering to those services.

By way of another example, the reallocation of resources may be performed by reallocating the one or more of the plurality of inappropriate resources to other suitable service class(es) or freed up if they are not needed. In addition, the reallocation of resources may be performed in case of SLA/KPI adherence issues for one or more service(s) and/or one or more of the plurality of network slice instance(s). Moreover, if there are SLA/KPI adherence issues, then resources of higher category may be allocated to the service or the network slice instance than what it is normally eligible for. In such cases, the POL-PROV-SS 202 may be informed to notify the operator for any updates to billing and/or obtaining a confirmation.

In the second sub-action, i.e., scaling up/down of the plurality of resources, the plurality of resources may have to scaled up/down, based on the reallocation of resources done as described above in the first sub-action. Further, if there are SLA/KPI adherence issues in one or more service(s) and/or one or more of the plurality of network slice instance(s), then scaling may be required. Moreover, even if there is no reallocation, as well as no SLA/KPI adherence issues, then based on the analysis of the performance management data on the resource occupancy levels and the traffic patterns predicted by the AN-COF-SS 208, the plurality of resources may have to be scaled up/down appropriately to be in line with estimated traffic. In addition, if scaling of one or more of the plurality of resources is not feasible due to scarcity of resources of a particular category, even then the NTW-SL-ORCH-SS 210 may have to decide to scale up more resources of the higher category. In such cases, the POL-PROV-SS 202 may be informed to notify the operator for any updates to billing and/or obtaining a confirmation.

Further, a second possible action from the set of possible actions, i.e., merging of network slices may be performed when there is more than one network slice instance with overlapping geographical area, and catering to one or more services belonging to the same or similar service classes. In such a case, the NTW-SL-ORCH-SS 210 may decide to merge one or more of the network slice instances that are catering to one or more services which allow sharing of one or more of the plurality of resources. Moreover, the decision to merge the one or more of the network slice instances may also depend on the resource occupancy levels, and level of fragmentation of each of the plurality of resources across the one or more of the plurality of network slice instances (which will determine the benefit of consolidation).

It should be noted that merging of the network slices may be simple or complex. By way of an example, merging of two network slice instances with same geographical area may require consolidation of one or more of the plurality of resources, and logical re-mapping of the services to the merged network slice instance (formed by merging the two network slice instances). Moreover, merging of two network slice instances with similar (overlapping) geographical area may require the consolidation of one or more of the plurality of resources, logical re-mapping of the services, and modification of the geographical area of the merged network slice instances to be a superset of the two network slice instances being merged. By way of another example, merging of the network slices may include merging of a network slice instance, say 'N-S1', with a network slice instance, say 'N-S2', in part of a geographical area 'C1'. Once 'N-S1' and 'N-S2' in the geographical area 'C1' are merged then, the merging of 'N-S1' may be performed with 'N-S3' in another part of the geographical area 'C2'. The merging of 'N-S1' and 'N-S2' and 'N-S1' with 'N-S3' as explained above may be feasible only when the service(s) that 'N-S1' is catering to does not span across the geographical area 'C1' and the geographical area 'C2'. If the condition is met, then 'N-S1' may be merged with 'N-S2' in the geographical area 'C1', and with 'N-S3' in the geographical area 'C2', and the services catered by the 'N-S1' will be re-mapped appropriately. Moreover, resource budgets for the two merged network slice instances may also have to re-computed, and the plurality of resources needs to be re-allocated accordingly. As will be appreciated, the mechanism described above to perform the merging of the two-network slice instance may also be applicable for merging of two network slice subnet instances.

Further, a third possible action form the set of possible actions, i.e., splitting of network slices may be performed when there may be more than one service mapped to a network slice instance. Moreover, in case of network subnet instance, the splitting of network slice subnet instances may be performed, when one network slice subnet instance may cater to more than one network slice instance. In an embodiment, the NTW-SL-ORCH-SS 210 may determine split of the network slice instance or the network subnet instance, when there is disproportionate use of one or more of the plurality of resources, and it is not feasible to apply sufficient controls to ensure that one consumer (consumer may correspond to the service in case of network slice instance, and network slice instance in case of the network slice subnet instance) does not affect SLA/KPI of other consumer(s). Moreover, splitting of the network slices may also be required when services belonging to different service classes are mapped to the same network slice instance, leading to different resource categories being assigned to the same network slice instance, thereby, leading to challenges in consolidation and optimization.

Further, a fourth possible action form the set of possible actions, i.e., modification of network slices may be performed when the SLA/KPI issues of a particular network slice subnet instance is affecting certain services catered to by the network slice instance, or affecting the network slice instance itself. Further, the modification of the network slices may be performed when use of another network slice subnet instance may lead to resource optimization, consolidation of the network slice subnet instances, and when use of another network slice subnet instance may aid in network slice instance consolidation, etc. In an embodiment, the modification of the network slices may involve changing of the constituents of the network slice instance (or the network slice subnet instance in case of hierarchical network slice subnets).

Further, a fifth possible action form the set of possible actions, i.e., re-mapping one or more services to at least one of the network slice instances, may be performed when consolidating the plurality of network slice instances, or when the SLA/KPI adherence issues are encountered by the service and cannot be re-solved using other set of possible actions described above. Further, the re-mapping may also be done to consolidate services of a certain service class to a smaller set of network slice instances in order to achieve better resource optimization. Moreover, the re-mapping may also be done when a new service request of a lower service class is received and is unable to be fulfilled due to scarcity of resources. In this case, a service of a higher service class may be re-mapped to another network slice instance in order to fulfil the new service request. The NTW-SL-ORCH-SS 210 may then prepare the consolidation plan based on the determined set of possible actions.

Once the consolidation plan is determined, at step 420, an impact of modifications may be assessed based on the consolidation plan. In other words, the impact of the set of possible actions may be assessed based on the plurality of factors. In an embodiment, the NTW-SL-ORCH-SS 210 may assess the impact of modifications determined in the previous step 418. Moreover, for each of the set of possible actions, the impact assessment may be done based on policy inputs (provisioned by the operator), dynamic network conditions, active network slice instances, and service instances. The impact assessment may cover, impact (if any) on the SLAs/KPIs of currently active services, impact (if any) on service continuity of currently active services, impact (if any) on the network slice instance(s) performance (SLA/KPI adherence level) and/or its constituent network slice subnet instance(s) performance, impact (if any) on minimum resource availability, and impact on billing/charging. In an embodiment, the impact on the service continuity of the currently active services may particularly be important for services that have strict service continuity requirements, for example, emergency services, premium voice and video services, etc. Further, the impact on the network slice instance(s) performance and/or its constituent network slice subnet instance(s) performance may be considered when a new service request is mapped to it, or during resource or slice modification (including merging and splitting). Moreover, the impact on minimum resource availability may be considered so that ability to cater to emergency or high-priority service requests is not affected. Further, the impact on the billing/charging may be considered when limit-of-credit threshold reaches faster, thresholds defined by the operator and/or customer, etc. For assessing this impact, the NTW-SL-ORCH-SS 210 may interact with the OSS/BSS 102 to obtain relevant inputs through the POL-PROV-SS 202. Alternatively, the impact of billing/charging may be defined as policies by the operator, so that the NTW-SL-ORCH-SS 210 may simply check policy allowance.

In an embodiment, the impact assessment may be performed by the NTW-SL-ORCH-SS 210 with help of inputs received from the AN-COF-SS 208 about the (predicted) resource occupancy trends and the resource utilization levels over time, and also taking into consideration, scaling up/down of the plurality of resources (based on rules and thresholds) as needed to accommodate the (predicted) service's resource occupancy level or the slice's resource occupancy level, and imposed soft limits and/or imposed hard limits in scaling up of the appropriate resources for the service or the network slice instance, and resorting to alternatives (if any) under those constrained situations. In an embodiment, the alternatives may have an adverse impact on the SLAs/KPIs as well as on service continuity. Further, the soft limits may be imposed by, for e.g., by policy, pre-defined rules, delay in bringing up the required hardware resource, etc. Moreover, the hard limits may be imposed by availability of the hardware resources.

Based on the impact assessment, the NTW-SL-ORCH-SS 210 may also determine necessary preventive/corrective actions to address or mitigate the (adverse) impact. This determination may be done using pre-provisioned rules or with the help of the AN-COF-SS 208 or a combination of both. In an embodiment, the preventive/corrective actions may include, changes required in the communication network to address the impact(s), and/or timing of updates required to fulfil the new service request or to perform resource optimization, etc., and/or assistance to be requested to other network functions to enable updates to be done smoothly.

By way of an example, after the impact assessment, the NTW-SL-ORCH-SS 210 may then check on policy inputs and allowances. For example, when the impact assessment is done based on trigger received for the new service request and policy indicates to carry out one or more of the corrective/preventive actions with minimum change to network topology and resource allocation, then the NTW-SL-ORCH-SS 210 may decide to implement only one or more of the corrective/preventive action that is necessary for fulfillment of the new service request. On the other hand, when network policy indicates service classes higher than 'x' should always be ensured of SLA/KPI adherence even in resource-constrained situations, then the NTW-SL-ORCH-SS 210 may decide to carry out one or more of the necessary corrective/preventive actions in order to ensure required SLA/KPI adherence.

By way of another example, when policy indicates that a service request of service class 'X' should always be fulfilled even if it means use of resources of the highest category, then the NTW-SL-ORCH-SS 210 may decide to carry out at least one of the corrective/preventive actions that is relevant for ensuring fulfillment of the service request which is a for a service associated with that service class 'X'. Moreover, the corrective/preventive actions determined (based on policy) may also include the set of possible actions determined, to address any adverse impacts of performing the one or more of the set of possible actions. For example, when a certain network slice instance is catering to a critical/emergency service, then the NTW-SL-ORCH-SS 210 may decide not to do any changes to that network slice instance as well as to that critical/emergency service. Moreover, when a certain network slice instance is catering to real-time voice or video services which require latency-sensitive service continuity, then the NTW-SL-ORCH-SS 210 may decide to defer any changes to a period of low traffic, or inform the network functions to not accept new session requests until the changes are carried out or take other steps to ensure service continuity (for e.g., temporary allocation of alternate resources, temporary borrowing of resources from another N-S instance, etc.).

Once the impact assessment is done, at step 422, necessary modifications may be performed. In other words, based on the assessed impact, the relevant network function(s) may be triggered to perform at least one of the set of determined possible actions. In an embodiment, the NTW-SL-ORCH-SS 210 may trigger the relevant network functions to carry out the changes (i.e., the at least one of the set of determined possible actions) finalized after the step 420. In reference to FIG. 1, the at least one of the set of determined possible actions may be carried out by the NFVO 112, SDN-O 114, RAN Manager 108 (also referred to as domain orchestrators) or by the common functions 120. As mentioned earlier, the at least one of set of determined possible actions may be performed immediately, deferred until there is no active session, done after a time delay, or done during a specific time window. Moreover, performing of the at least one of set of determined possible actions may be based on instructions received from the NTW-SL-ORCH-SS 210 and/or governed by policy. Further, the NTW-SL-ORCH-SS 210 may also trigger the NFVO 112, when any of the at least one of the set of determined possible actions have to be informed to specific network functions (e.g., to avoid routing of traffic to the network functions undergoing a change) by the NFVO 112. In an embodiment, such information may be passed to the network function(s) themselves without involvement of the NFVO 112.

Once the trigger to perform the at least one of the set of determined possible solution is generated and the associated actions are carried out successfully, at step 424, an effectiveness of performing the at least one of the set of possible actions may be verified. In addition, based on the verified effectiveness, one or more corrective actions may be performed. In an embodiment, when above steps, i.e., the step 414 to the step 422 are carried upon receiving the new service request, then after performing the at least one of the set of possible actions, the NTW-SL-ORCH-SS 210 may request the NTW-ST-CONF-SS 214 to provide a suitable network shell hierarchy for the new service request. Moreover, the NTW-ST-CONF-SS 214 may also consider resources of higher categories for fulfilling the new service request if needed, based on guidance from policy. Further, the NTW-SL-ORCH-SS 210 may also inform the SL-SRV-MON-SS 212 about the at least one of the set of possible actions performed. The SL-SRV-MON-SS 212 may monitor the SLA/KPI adherence levels as well as any faults. The SL-SRV-MON-SS 212 may receive help of the AN-COF-SS 208 to determine correlation of any drop or rise in the SLA/KPI adherence level due to the at least one of the set of possible actions carried out by the NTW-SL-ORCH-SS 210 and informs the NTW-SL-ORCH-SS 210 accordingly.

Based on feedback from the SL-SRV-MON-SS 212, the AN-COF-SS 208, and the NTW-ST-CONF-SS 214 (service request could be fulfilled or not) on the effectiveness of performing the at least one of the set of possible actions, the NTW-SL-ORCH-SS 210 may perform necessary corrective action(s) in case the SLA/KPI adherence level is dropped or did not improve significantly. In this case, the corrective action(s) may correspond to determination of at least one of the set of possible actions as described in the step 418 taking into consideration one or more of the set of possible actions performed earlier. In addition, the NTW-SL-ORCH-SS 210 may perform necessary corrective action in case the new service request received could not be fulfilled. In this case, the corrective action(s) may correspond to determination of at least one of the set of possible actions as described in the step 418 taking into consideration one or more of the set of possible actions performed earlier, and being more aggressive in optimization of resources of lower service classes. Moreover, the NTW-SL-ORCH-SS 210 may periodically assess the effectiveness of the at least one of the set of possible actions, and accordingly refine the pre-threshold for determining when changes should be done, level of optimization to be done, etc. This self-adaptation results in improved operation over a period of time.

Figure 7:
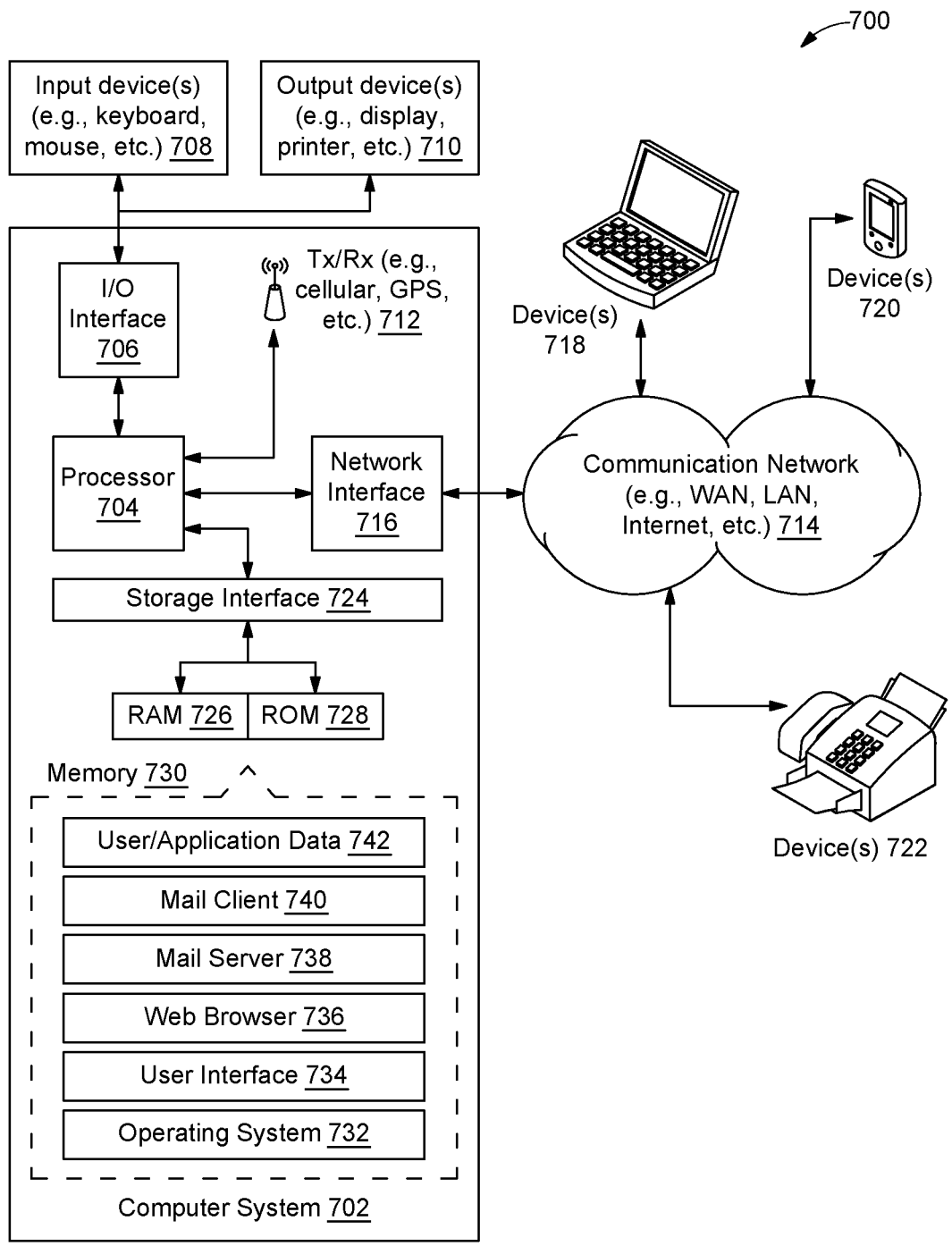
FIG. 7 illustrates a block diagram of an exemplary computer system for implementing embodiments consistent with the present disclosure.

Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multicore, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for effective service fulfillment in a communication network. The method and system may first determine utilization of each of a plurality of resources for each of a plurality of network slice instances. In an embodiment, each of the plurality of network slice instances may include a set of network slice subnet instances. The method and system may then determine a service allocation schedule and a service resource utilization across one or more service classes and one or more resource classes for each of the plurality of resources. Further, the method and system may determine at least one of a set of possible actions required to be performed in at least one of the plurality of resources, a plurality of services, and the plurality of network slice instances based on a consolidation plan. In an embodiment, the consolidation plan may be created based on the service allocation schedule and the service resource utilization. Additionally, the method and system may assess an impact of each of the set of possible actions based on a plurality of factors. In an embodiment, the plurality of factors may include at least one of dynamic network conditions, active network slice instances, and service instances. Thereafter, the method and system may trigger a relevant network function(s) to perform at least one of the set of determined possible actions based on the assessed impact.

The specification has described method and system for effective service fulfillment in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for effective service fulfilment in a communication network, the method comprising:
    upon receiving a new service request,
        determining, by a network device, utilization of each of a plurality of resources for each of a plurality of network slice instances currently serving a plurality of services, wherein each of the plurality of network slice instances includes a set of network slice subnet instances;
    determining, by the network device, a service allocation schedule and a service resource utilization across one or more service classes and one or more resource classes for each of the plurality of resources;
    determining, by the network device, at least one of a set of possible actions required to be performed in at least one of the plurality of resources, the plurality of services, and the plurality of network slice instances based on a consolidation plan, wherein the consolidation plan is created based on the service allocation schedule and the service resource utilization, wherein the set of possible actions comprises: merging of at least two network slice instances spanning across an overlapping geographical area, for serving one or more active service instances belonging to same service class by:
  logical re-mapping of the one or more active service instances catered by the at least two network slice instances to the merged network slice instance;
assessing, by the network device, an impact of each of the set of possible actions based on a plurality of factors, wherein the plurality of factors comprises at least one of dynamic network conditions, active network slice instances, and service instances;
triggering, by the network device, a relevant network function(s) to perform at least one of the set of determined possible actions based on the assessed impact;
verifying, by the network device, an effectiveness of performing the at least one of the set of possible actions based on a new network slice shell hierarchy provided for the new service request; and
performing, by the network device, a corrective action for fulfillment of the new service request based on the effectiveness of performing the at least one of the set of possible actions.

2. The method of claim 1, further comprising:
determining, by the network device, an availability of an appropriate resource from the plurality of resources upon receiving the new service request,
  wherein the new service request includes performance requirements, a priority, a class associated with users, a geographical area of a service, a service class, and a duration of the service; and
identifying, by the network device, a requirement for a change in one or more of the plurality of network slice instances to fulfil the new service request.

3. The method of claim 2, wherein determining the availability comprises determining, by the network device, a requirement of the appropriate resource for the new service request based on a set of service factors, wherein the set of service factors include service characteristics, service performance requirement, and service dimensions.

4. The method of claim 2, wherein determining availability of the appropriate resource comprises:
fetching, by the network device, a first set of resource budgets and service performance requirement for each of the set of network slice subnet instances of the plurality of network slice instances; and
determining, by the network device, a network shell hierarchy using a template hierarchy, wherein the network shell hierarchy includes a slice subnet hierarchy.

5. The method of claim 4, wherein determining the network shell hierarchy comprises identification of one of a reuse of an existing network slice instance or creation of a new network slice instance, and wherein creation of the new network slice instance comprises determination of one of a reuse of an existing network slice subnet instance or creation of a new network slice subnet instance based on the slice subnet hierarchy.

6. The method of claim 1, further comprising:
identifying, by the network device, a requirement for a change in one or more of the plurality of network slice instances or one or more services based on an analysis of at least one of fault management data or performance management data.

7. The method of claim 6, further comprising:
receiving, by the network device, the at least one of the fault management data or the performance management data from the communication network;
analyzing, by the network device, the at least one of the fault management data or the performance management data to identify a plurality of faults or a plurality of performance issues in the communication network, based on a pre-defined threshold, pre-defined performance criteria, or service level criteria; and
analyzing, by the network device, an impact of the plurality of faults or the plurality of performance issues on at least one of the plurality of network slice instances, the set of network slice subnet instances, services and service classes, and impacted geographical areas.

8. The method of claim 1, wherein determining the service allocation schedule and the service resource utilization comprises determining service level resource utilization and service class level resource utilization based on the plurality of resources allocated to one or more service classes and the resource classes in various geographical areas associated with the service.

9. The method of claim 1, wherein the set of possible action further comprises modification of resource allocation, splitting of network slices, modification of network slices, and re-mapping one or more services to at least one of the network slice instances.

10. The method of claim 1, wherein the impact assessment of each of the set of possible actions includes at least one of an impact on service level criteria or key performance indicators of currently active services, an impact on service continuity of currently active services, an impact on performance of a network slice instance(s) or a network slice subnet instance upon mapping the new service or during at least one of the set of possible actions, an impact of minimum resource availability, and an impact on billing.

11. The method of claim 1, wherein verifying the effectiveness of performing the at least one of the set of modifications based on the new network slice shell hierarchy provided for the new service request comprises:
determining a correlation of any drop in service level agreement (SLA) adherence level of one or more active service instances due to the at least one of the set of possible actions; and
performing, by the network device, a corrective action in case the SLA adherence level is dropped based on the effectiveness of the at least one of the set of modifications.

12. A system for effective service fulfilment in a communication network, the system comprising:
a processor; and
a memory communicatively coupled to the processor, wherein the memory stores processor executable instructions, which, on execution, causes the processor to:
  determine utilization of each of a plurality of resources for each of a plurality of network slice instances currently serving a plurality of services, upon receiving a new service request, wherein each of the plurality of network slice instances includes a set of network slice subnet instances;
  determine a service allocation schedule and a service resource utilization across one or more service classes and one or more resource classes for each of the plurality of resources;
determine at least one of a set of possible actions required to be performed in at least one of the plurality of resources, the plurality of services, and the plurality of network slice instances based on a consolidation plan, wherein the consolidation plan is created based on the service allocation schedule and the service resource utilization, wherein the set of possible actions comprises: merging of at least two network slice instances spanning across an overlapping geographical area, for serving one or more active service instances belonging to same service class by:

logical re-mapping of the one or more active service instances catered by the at least two network slice instances to the merged network slice instance;

assess an impact of each of the set of possible actions based on a plurality of factors, wherein the plurality of factors comprises at least one of dynamic network conditions, active network slice instances, and service instances;

trigger a relevant network function(s) to perform at least one of the set of determined possible actions based on the assessed impact;

verify an effectiveness of performing the at least one of the set of possible actions based on a new network slice shell hierarchy provided for the new service request; and perform a corrective action for fulfillment of the new service request based on the effectiveness of performing the at least one of the set of possible actions.

13. The system of claim 12, wherein the processor executable instructions further cause the processor to:

determine an availability of an appropriate resource from the plurality of resources upon receiving the new service request, wherein the new service request includes performance requirements, a priority, a class associated with users, a geographical area of a service, a service class, and a duration of the service; and identify a requirement for a change in one or more of the plurality of network slice instances to fulfil the new service request.

14. The system of claim 13, wherein, to determine the availability, the processor executable instructions further cause the processor to:

determine a requirement of the appropriate resource for the new service request based on a set of service factors, wherein the set of service factors include service characteristics, service performance requirement, and service dimensions.

15. The system of claim 13, wherein, to determine availability of the appropriate resource, the processor executable instructions further cause the processor to:

fetch a first set of resource budgets and service performance requirement for each of the set of network slice subnet instances of the plurality of network slice instances; and determine a network shell hierarchy using a template hierarchy, wherein the network shell hierarchy includes a slice subnet hierarchy.

16. The system of claim 15, wherein, to determine the network shell hierarchy, the processor executable instructions further cause the processor to:

identify one of a reuse of an existing network slice instance or creation of a new network slice instance, and wherein creation of the new network slice instance comprises determination of one of a reuse of an existing network slice subnet instance or creation of a new network slice subnet instance based on the slice subnet hierarchy.

17. The system of claim 1, wherein the processor executable instructions further cause the processor to:

identify a requirement for a change in one or more of the plurality of network slice instances or one or more services based on an analysis of at least one of fault management data or performance management data.

18. The system of claim 17, wherein the processor executable instructions further cause the processor to:

receive the at least one of the fault management data or the performance management data from the communication network;

analyze the at least one of the fault management data or the performance management data to identify a plurality of faults or a plurality of performance issues in the communication network, based on a pre-defined threshold, pre-defined performance criteria, or service level criteria; and analyze an impact of the plurality of faults or the plurality of performance issues on at least one of the plurality of network slice instances, the set of network slice subnet instances, services and service classes, and impacted geographical areas.

19. The system of claim 12, wherein, to determine the service allocation schedule and the service resource utilization, the processor executable instructions further cause the processor to:

determine service level resource utilization and service class level resource utilization based on the plurality of resources allocated to one or more service classes and resource classes in various geographical areas associated with the service.

20. A non-transitory computer-readable storage medium for effective service fulfilment in a communication network, having stored thereon, a set of computer-executable instructions causing a computer comprising one or more processors to perform steps comprising:

determining utilization of each of a plurality of resources for each of a plurality of network slice instances currently serving a plurality of services, upon receiving a new service request, wherein each of the plurality of network slice instances includes a set of network slice subnet instances;

determining a service allocation schedule and a service resource utilization across one or more service classes and one or more resource classes for each of the plurality of resources;

determining at least one of a set of possible actions required to be performed in at least one of the plurality of resources, the plurality of services, and the plurality of network slice instances based on a consolidation plan, wherein the consolidation plan is created based on the service allocation schedule and the service resource utilization, wherein the set of possible actions comprises: merging of at least two network slice instances spanning across an overlapping geographical area, for serving one or more active service instances belonging to same service class by:

logical re-mapping of the one or more active service instances catered by the at least two network slice instances to the merged network slice instance;

assessing an impact of each of the set of possible actions based on a plurality of factors, wherein the plurality of factors comprises at least one of dynamic network conditions, active network slice instances, and service instances; and triggering a relevant network function(s) to perform at least one of the set of determined possible actions based on the assessed impact.

\* \* \* \* \*